(No Model.)

G. W. LOGGIE.
TRANSFER APPARATUS FOR SAW MILLS.

No. 342,918. Patented June 1, 1886.

Witnesses:
Geo. H. Strong

Inventor
Geo. W. Loggie
By Dewey & Co.
Att'ys

UNITED STATES PATENT OFFICE.

GEORGE W. LOGGIE, OF PORTLAND, OREGON.

TRANSFER APPARATUS FOR SAW-MILLS.

SPECIFICATION forming part of Letters Patent No. 342,918, dated June 1, 1886.

Application filed February 3, 1886. Serial No. 190,741. (No model.)

*To all whom it may concern:*

Be it known that I, GEORGE W. LOGGIE, of Portland, Oregon, have invented an Improvement in Transfer Apparatus for Saw-Mills; and I hereby declare the following to be a full, clear, and exact description of the same.

My invention relates to an apparatus for transferring lumber in saw-mills, or for iron rails or other transfer work.

It consists of stationary skids or timbers, upon which the cant or lumber falls after passing the saw, the skids extending transversely to the line of the cant, a series of parallel skids mounted so as to oscillate about double centers or fulcrums, and a mechanism whereby one end or the other may be raised about its fulcrum at will. In combination with these movable lever-skids are traveling chains so arranged that when the skids and chains are raised about the stationary skids the lumber will be carried upon them from one side to a point beyond the center, and from this point may be carried, by raising the opposite end, to the point of delivery.

Figure 1:
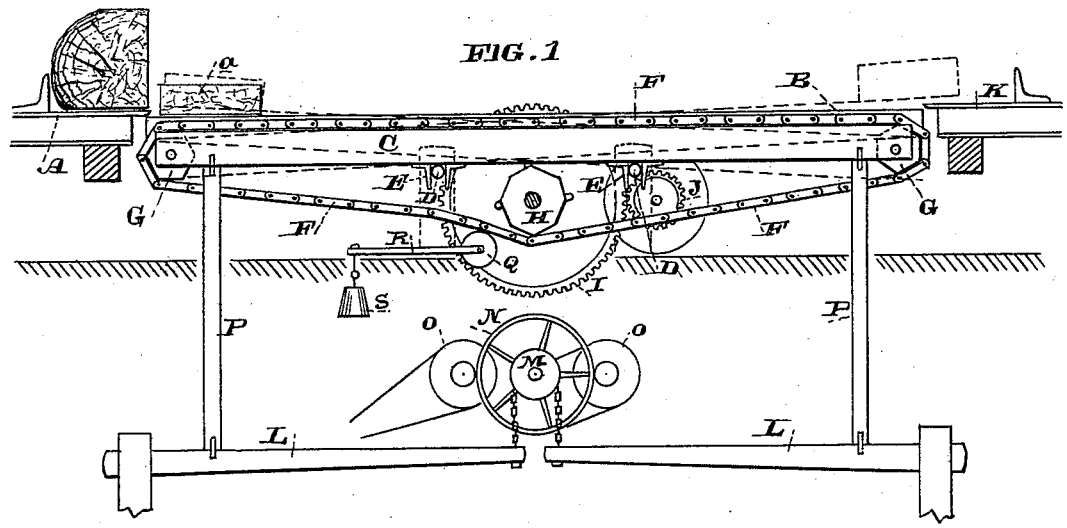
Figure 2:
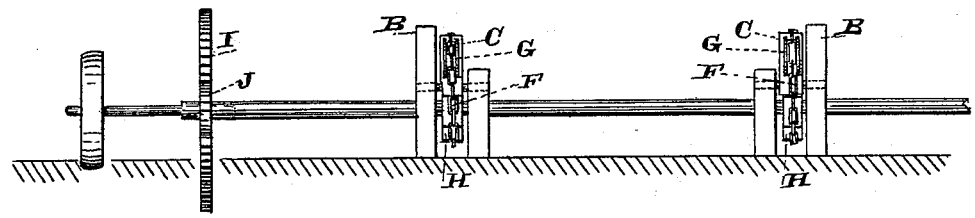
Figure 3:
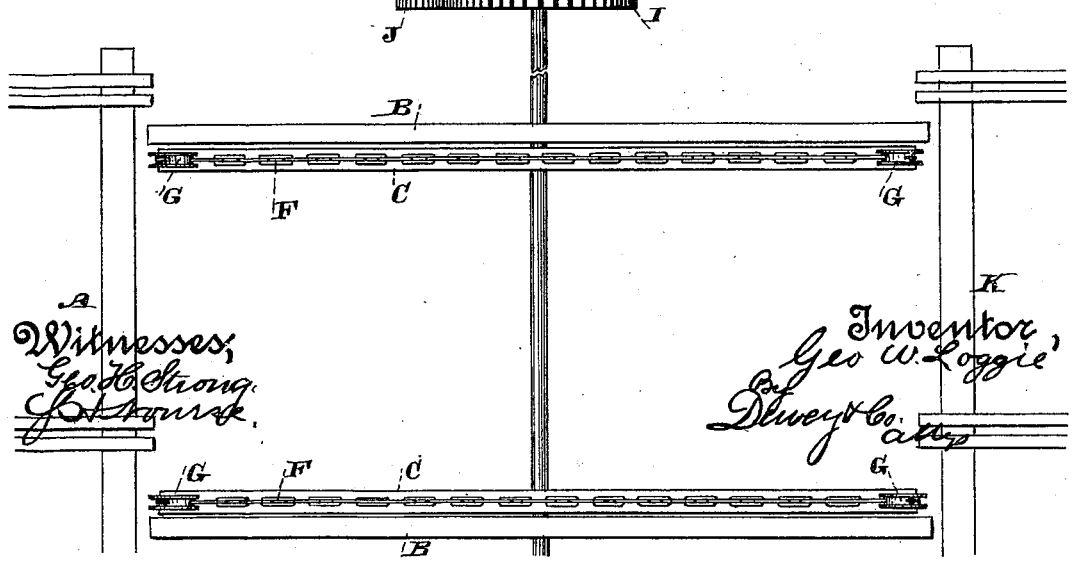

Referring to the accompanying drawings for a more complete explanation of my invention, Figure 1 is a side elevation of the apparatus, showing an end view position of the cants or lumber upon the device. Fig. 2 is an end view. Fig. 3 is a plan or top view.

This apparatus is especially useful in mills where the logs are first sawed into large pieces called "cants," which must afterward be re-sawed by a second sawing apparatus, and it is placed in such a position that after the log has passed the saw the cant may fall directly upon this apparatus, and by raising that end of the chains or skids the cant will lie upon them, and thus be carried across to a point more than half-way or beyond the center, where it can be taken up by raising the opposite ends of the chain skids and carried the remainder of the distance across to the opposite side.

A is a saw-carriage upon which the log is placed, and from which the cant (shown at *a*) will fall upon the apparatus. This apparatus consists of parallel timbers or skids B B and C C. The skids B B are supported upon suitable foundations and remain stationary, and there may be enough of them to receive lumber of any desired length. Parallel with these are the secondary movable skids C C, which are supported upon fulcrums D, as shown, so that their upper surfaces are below the level of the upper surfaces of the stationary skids B. These fulcrums may be made in any suitable or desirable manner. In the present case I have shown plates E secured to the sides of the timbers C, and having elongated guiding-slots extending downward, as shown at E, which fit over the fulcrum bars or pins, and serve to guide the skids C, when either one or the other is raised, so as to prevent their becoming disarranged with relation to their fulcrums. These fulcrums D are at some distance each side of the center of the skids, so that when either end of the skid is raised it moves about the fulcrum farthest from it.

F F are chains passing around chain-pulleys G at each end of the skids C; thence over the upper surfaces of the skids, and the chains are driven by sprocket-wheels H in the center below the apparatus. These wheels are mounted upon a shaft, and this shaft has connected with it a suitable driving-gear—such as shown at I J—and the chains are kept constantly moving by power derived from the engine or other source, as before described. The upper surfaces of the chains, when the skids C rest upon both fulcrums, are below the level of the skids B, and when the cant has been dropped from the saw-carriage A it will fall upon the stationary skid B, or upon rolls journaled between them, by which it may be transferred longitudinally as far forward as desired. These rolls will be necessary in cases where the mill is adapted for sawing very long lumber, and where short lumber is sometimes sawed. This short lumber may be delivered from the saw-carriage upon the rolls at the end of the apparatus nearest the saw, and may then be carried by the rolls as far forward as desired before being transferred to the opposite or resawing carriage.

When it is desired to transfer a cant from one side to the other, the timbers or skids C, with their traveling chains, will be raised by means of levers, screw, hydraulic or other suitable apparatus so that the end beneath the point where the cant lies may be raised above that end of the stationary timbers or skids B. This leaves the cant lying upon the traveling chains, and as the fulcrum about which this end has been raised is a considerable distance beyond the center of the timber it will be manifest that the movement of the chains will carry the cant to a point beyond its center before it will strike the stationary skids B, by reason of the opposite end of the skids C being below them. When the opposite end of the skids C are raised, it will be manifest that the chains will again receive the cant at this point, and will transfer it to the end, where it may be delivered upon the second or resawing carriage, K. It will be manifest that if a single fulcrum were employed either at the center or at any other point about which the skids C and their chains could be moved, the cants would only be carried to a point above or near this fulcrum, and that the lifting of the opposite end of the skids C, with the chains, would fail to raise the chains sufficiently to receive and carry the cants on from this point; but by using two fulcrums separated by a considerable interval the cants will always be carried beyond one fulcrum, so that when the opposite end of the levers or skids C are raised about their fulcrum, they will rise sufficiently to lift the cant and leave it lying upon the chains, upon which it can be transferred to its destination.

Various methods may be adopted for operating the levers or skids C, as before stated. In the present case I have shown levers L, fulcrumed at the outer end and having their adjacent ends provided with chains, which pass over pulleys M. These pulleys have a friction-wheel, N, and driving friction-wheels O, with suitable belts by which they are operated. When power is applied through one of these friction-wheels O, it will revolve the wheel N and the drum M in one direction—as, for instance, to the right. This will raise the lever L, and, by means of the connecting rod or bar P, will raise the left end of the skids C and their chains, so as to carry the load from the left end to a point beyond the center. By throwing this friction-wheel out of contact and the other one into contact the pulley M and the drum N will be rotated in the opposite direction or to the right, and will act to depress the lever L and the left end of the skids C and chains, and will raise the lever L' and the right end of the skids C and the chains, so as to complete the transfer of the load. It will be seen that as the driving sprocket-wheel H, by which the chain is moved, is at or near the center, below the skids C, while the fulcrums D D are at points upon either side of the center, the tension of the chain F will vary with the tilting of the timbers. A constant tension of the apparatus may be applied to these chains in various ways. In the present case I have shown a pulley, Q, journaled in the end of a lever, R, so as to press against the chains upon either side of the sprocket-wheel, the lever R being provided with a sufficient weight, S, at its opposite end to keep the pulley Q pressing against the chain.

It will be manifest that various modifications may be made in the mechanical construction of this apparatus without essentially altering the character of the invention, and that it may be constructed so as to move in either direction, as desired.

Having thus described my invention, what I claim as new, and desire to secure by Letters Patent, is—

1. A transfer apparatus consisting of parallel stationary skids or timbers upon which the lumber may be received, other skids having continuously-traveling chains over their upper surfaces and in a plane a little below the upper surfaces of the stationary skids, said stationary skids having fulcrums about which they may be tilted, so as to raise either end alternately above the surface of the stationary skids, substantially as herein described.

2. The tilting skids or levers having continuously-traveling chains or carriers moving over their upper surfaces at a level slightly below that of the corresponding stationary skids upon which the lumber is first received, in combination with fulcrums situated at points either side of the center, about which the tilting levers or skids may be moved alternately, substantially as herein described.

3. The tilting levers or skids having double fulcrums situated at either side of the center, about which they may move, in combination with traveling chains or carriers moving upon their upper surfaces and over pulleys or drums at either end of the skids, and a driving-wheel or mechanism situated below the center of the skids, substantially as herein described.

4. The tilting double-fulcrumed levers or skids with the chains or carriers moving continuously upon their upper surfaces, in combination with the levers and friction apparatus, whereby either end of the skids may be raised while the other is depressed, substantially as herein described.

5. The double-fulcrumed tilting levers or skids having the continuously-moving chains or carriers upon their upper surfaces, with the guide-pulleys at opposite ends of the timbers and the driving wheels or pulleys below the center, in combination with the tension levers and pulleys, substantially as herein described.

In witness whereof I have hereunto set my hand.

GEORGE W. LOGGIE.

Witnesses:
S. H. NOURSE,
H. C. LEE.